United States Patent

[11] 3,542,429

| [72] | Inventors | Masahiko Inoue;<br>Katsuo Sakurai, Toyota-shi, Japan |
|---|---|---|
| [21] | Appl. No. | 750,208 |
| [22] | Filed | Aug. 5, 1968 |
| [45] | Patented | Nov. 24, 1970 |
| [73] | Assignee | Toyota Jidosha Kogyo Kabushiki Kaisha<br>Toyota-cho, Toyota-shi, Aichi-ken, Japan |
| [32] | Priority | Aug. 26, 1967 |
| [33] | | Japan |
| [31] | | No. 42/72849 |

[54] ADJUSTABLE HEAD REST FOR VEHICLE SEAT
6 Claims, 6 Drawing Figs.

[52] U.S. Cl. .................................... 297/410,
248/408
[51] Int. Cl. ........................................ A47c 7/36
[50] Field of Search ........................................ 297/410,
408; 248/408

[56] References Cited
UNITED STATES PATENTS
377,147  1/1888  Delaney ...................... 297/410X

| 1,745,845 | 2/1930 | Ebbecke | 248/408X |
| 1,867,600 | 7/1932 | Schwarzkopf | 297/410 |
| 2,613,731 | 10/1952 | Roginski | 297/410X |
| 3,027,194 | 3/1962 | Rumptz | 297/410 |
| 3,063,751 | 11/1962 | Hatch | 297/410 |
| 3,145,965 | 8/1964 | Stein | 248/408 |

*Primary Examiner*—Nile C. Byers, Jr.
*Attorney*—McGlew and Toren

ABSTRACT: An adjustable headrest for a vehicle seat is formed by a tubular support member attached to the frame in the back of the seat, a support rod slidably fitted within the support member, and a headrest affixed to the upper end of the support rod. A plate spring is attached to the support member and is arranged to engage grooves in the support rod for adjustably positioning the headrest. An additional retainer groove is located in the rod for engagement with the spring plate to prevent the upward displacement of the support rod from the support member.

INVENTORS
MASAHIKO INOUE
BY KATSUO SAKURAI

McGlew and Toren
ATTORNEYS

Patented Nov. 24, 1970

INVENTORS
MASAHIKO INOUE
KATSUO SAKURAI

BY M<sup>c</sup>Glew and Toren
ATTORNEYS

ADJUSTABLE HEAD REST FOR VEHICLE SEAT

SUMMARY OF THE INVENTION

The invention is directed to a headrest assembly for a vehicle seat and, more particularly, it is concerned with means for adjustably positioning the headrest relative to the vehicle seat.

Recently, headrests have been used on the seats in motor vehicles to limit the severity of head and neck injuries caused by rear end collisions. The great number and seriousness of neck injuries, often referred to as whip lash injuries, caused by rear end collisions has pointed out a need to afford protection for the driver and passengers from such injuries. However, while head rests limit the extent to which a person's head is thrown rearwardly as the result of a rear end collision, it must also be kept in mind that the rearward field of vision of the driver must not be seriously reduced or else in correcting one hazard another one will be created.

In maintaining the size of the headrest within limits which will not encroach, to any great extent, on the field of vision of the driver, it is also important to provide a headrest which is adjustably positionable to the height of the person using the seat. Moreover, since the adjustment of the headrest is normally a hand operation, the adjustment means must be easy to use while affording a positive engagement for the headrest in the desired position. Further, it is important to provide a headrest support arrangement which does not permit the displacement of the headrest support rod from the back of the vehicle seat.

Accordingly, it is the primary object of the present invention to provide a headrest assembly whose height above the seat is adjustable, and which incorporates means for preventing an inadvertent displacement of the support rod for the headrest assembly from the back of the vehicle seat.

Another object of the invention is to employ hand operated means for adjusting the headrest which permit ease in adjusting the headrest in the upward direction, while affording adequate support for the headrest against an impact in the downward direction.

Still, another object of the invention is to provide spring means located within the back of the vehicle seat for engaging grooves or recesses in the support rod for affecting the adjustability of the headrest.

Moreover, another object of the invention is to incorporate a retaining member as part of the spring means for preventing the upward removal of the support rod from the vehicle seat unless such removal is specifically intended.

Yet, another object of the invention is to provide an inexpensive headrest assembly which is simple in construction and easy to operate.

Therefore, the present invention is directed to an adjustable headrest for a vehicle seat in which a tubular support member is affixed to the frame within the back of a vehicle seat. A support rod is slidably fitted within the support member and extends upwardly above the seat with a headrest member mounted on its upper end. Grooves are spaced longitudinally along one side of the support rod. A spring plate is attached to the support member within the back of the vehicle seat and is shaped to engage the grooves in the support rod for adjustably positioning the headrest member above the back of the seat.

In addition to the grooves for adjustably positioning the headrest member a second or retainer groove is located on the opposite side of the support rod and below the other grooves. This retainer groove is arranged to receive the lower end of the spring plate when the headrest is in its fully extended position to prevent the headrest member from being inadvertently displaced from the back of the vehicle seat.

The grooves employed for adjustably positioning the headrest member are shaped to afford ease in the upward adjustment of the headrest member while providing adequate support against displacement when a downward impact is applied to the headrest member.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
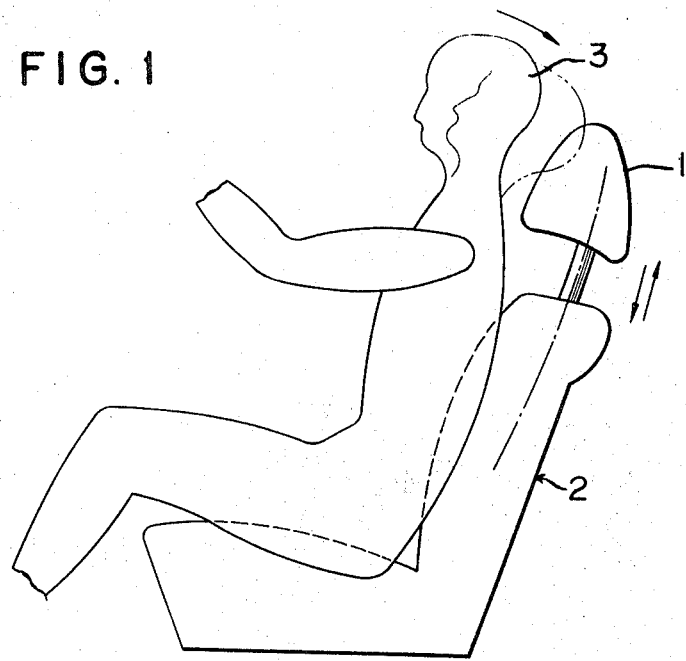
FIG. 1 is a schematic side view of a vehicle seat and an adjustable headrest illustrating the normal direction of impact against the headrest and the direction of adjustability of the headrest.

In FIG. 1, a headrest 1 is shown adjustably positionable on the back of a vehicle seat 2 and the outline of a figure shown in full lines, indicates the normal position of a person occupying the seat. When the vehicle is struck from the rear, the head 3 of the person is thrown rearwardly against the headrest, as shown in dash lines. The impact of the head 3 against the headrest tends to drive the headrest downwardly into the back of the vehicle seat unless some means is provided for holding it in position. The arrows in back of the headrest indicate the direction in which it is adjustable.

Figure 2:
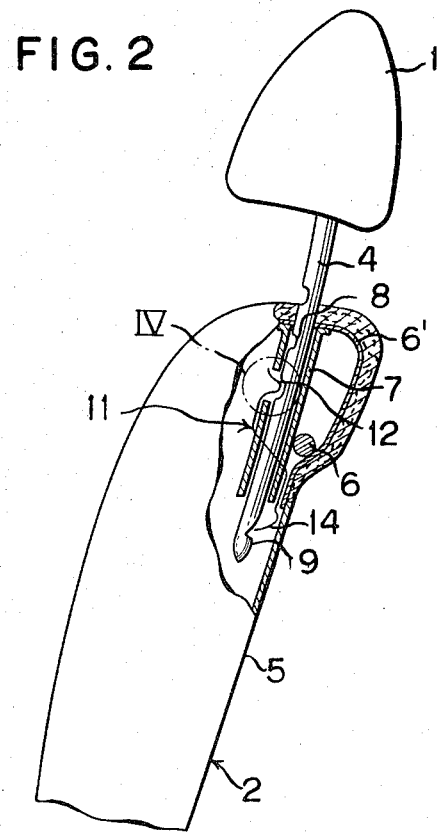
FIG. 2 is a side view of a vehicle seat and a headrest incorporating a support arrangement for adjustably positioning the headrest in accordance with the present invention.
Figure 3:
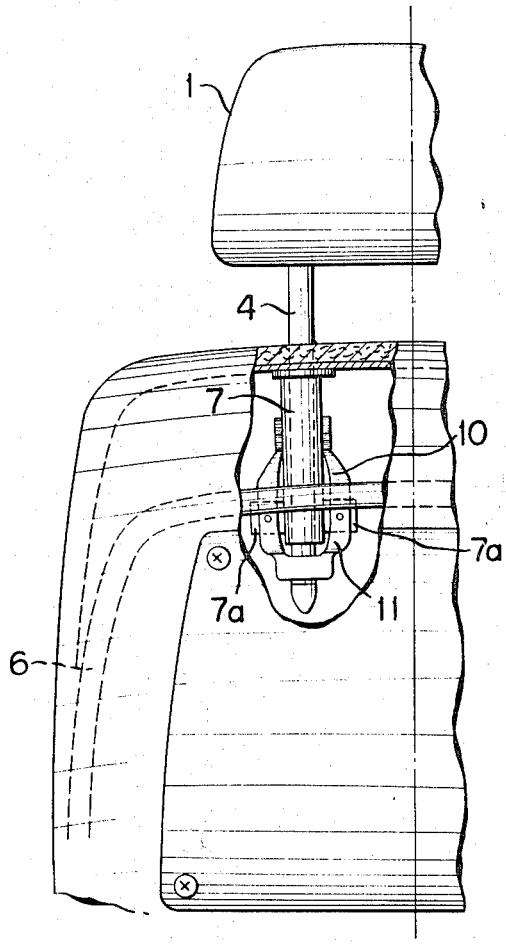
FIG. 3 is a rear view, partly in section, of the support arrangement shown in FIG. 2.

In FIG. 2 the headrest 1 is mounted on the upper end of an upwardly extending support rod 4 which depends downwardly into the back of a vehicle seat extending through a tubular guide member 7 secured to the frame section 6 and 6' of the seat 2. As shown in the drawing, the support rod 4 is cylindrical, however, a polygonal section of rod could also be used without deviating from the invention. In FIG. 2 the surface of the rod facing toward the front of the seat 2 is provided with a series of grooves 8 spaced apart in the longitudinal direction of the rod.

Figure 4:
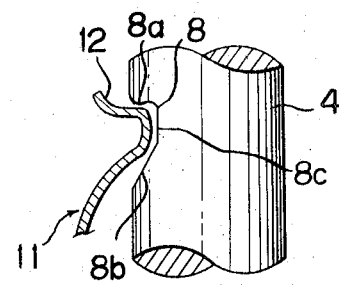
FIG. 4 is an enlarged detail view of the encircled portion IV in FIG. 2.
Figure 5:
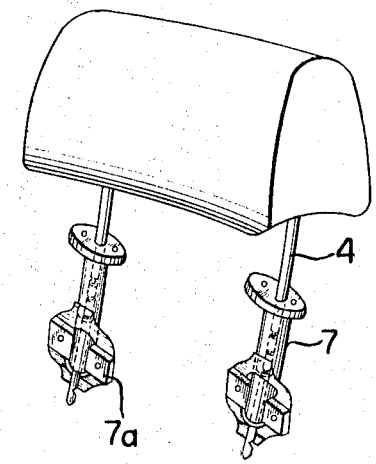
FIG. 5 is a perspective view of the headrest support arrangement as shown in FIGS. 2 and 3.
Figure 6:
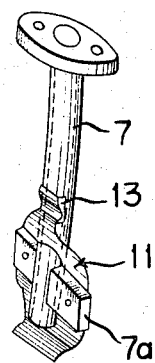
FIG. 6 is an enlarged perspective view of a portion of the support arrangement shown in FIG. 5.

As shown in FIG. 4 the grooves 8 are composed of an upper surface 8a, a lower surface 8b and an intermediate surface 8c interconnecting the upper and lower surfaces. The upper surface 8a is slightly curved and extends generally in a plane transverse to the longitudinal axis of the support rod. The portion of the upper surface 8a adjacent the circumferential periphery of the support rod extends generally in a plane transverse to the longitudinal axis of the support rod. The portion of the upper surface 8a adjacent the circumferential periphery of the support rod extends slightly downward from the inner portion of the upper surface providing a slightly rounded protuberance. The lower surface 8b is inclined at an angle to the longitudinal axis of the support rod extending inwardly and upwardly toward the lower edge of the intermediate surface 8c. The intermediate surface 8c extends substantially parallel with the longitudinal axis of the support rod.

On the opposite side or surface of the support rod 4 from the one containing the grooves 8, a retainer groove 9 is located spaced below the lowermost one of the grooves 8. As can be noted from FIG. 2, the retainer groove 9 has a generally wedgelike shape.

Spaced below the upper end of the support member 7 and extending laterally from it are a pair of lugs 7a. A plate spring 11 containing an elongated centrally located hole 10 is attached to the leg 7a and the tubular support member extends through the hole 10 in the plate spring. When viewed in the longitudinal direction, as shown in FIG. 2, the plate spring has an S-shape and its upper end 12 fits through an opening 13 in the support member 7 for engagement within one of the grooves 8 in the support rod 4. At its lower end 14 the plate spring is located below the lower end of the support member 7 and it is directed inwardly toward the surface of the support rod.

The upper end 12 of the spring plate 11 is bent to provide an inwardly directed nose having a configuration similar to the shape of the grooves 8 in the support rod and being arranged to fit within one of the grooves for adjustably supporting the headrest above the back of the vehicle seat. Due to the shape of the groove and of the upper end 12 of the plate spring when an impact is directed against the headrest in the downward direction the upper surface 8a of the groove is forced downwardly against the upper surface of the upper end 12 of the plate spring and is prevented from sliding or moving downwardly through the tubular support member 7. However, when the headrest and the support rod is lifted upwardly the inclined or wedge-shaped lower surfaces 8b of the groove 8 slides upwardly along the similarly shaped surface of the plate spring affording ease in adjusting the headrest in the upward direction. The spring action of the plate 11 maintains its upper end 12 in a position within a selected one of the grooves 8.

In FIG. 2 the headrest 1 is shown fully extended above the vehicle seat with the upper end 12 of the plate spring 11 engaged within the lowermost groove on the forward side of the support rod. In this position the lower end 14 of the plate spring is engaged within the groove 9 on the opposite side of the support rod from the grooves 8. The engagement of the plate spring in the groove 9 prevents the headrest from being inadvertently lifted upwardly from the back of the seat. As can be noted in the drawing the lower end 14 of the spring plate extends downwardly into the wedgelike shaped groove 9 so that the headrest cannot be lifted upwardly without a considerable application of force against the action of the plate spring. However, if it is necessary to remove the headrest from the back of the seat the application of sufficient force to deform the lower end 14 of the plate will dislodge the support rod from its engagement with the plate spring and it can be then removed from the seat.

Accordingly, by employing a simple S-shaped plate spring the headrest is easily adjustable on the back of the vehicle seat while being adequately supported against impact and, moreover, the plate spring prevents the inadvertent displacement of the headrest from the seat.

We claim:

1. A supporting device for mounting an adjustable headrest on the back of a vehicle seat comprising a headrest member, a support rod secured to said headrest member and extending downwardly therefrom, a support member adapted to be secured to the frame of the back of the vehicle seat, said support member at least partially enclosing a portion of said support rod and said support rod being movably positionable therethrough, a plurality of grooves formed along one side of said support rod and spaced apart in the longitudinal direction of said rod, said grooves extending transversely of the longitudinal axis of said support rod, said grooves extending only partially about the outer periphery of said support rod and being in alinement in the longitudinal direction of said rod, each of said grooves formed in said rod comprises an upper surface extending generally perpendicularly to the longitudinal axis of said support rod, and a lower surface obliquely disposed relative to the longitudinal axis of said support rod and inclined inwardly in the upward direction toward the longitudinal axis of said support rod, spring means fitted onto said support member and removably engageable into individual ones of said grooves in said support rod for securing said rod in position within said support member, said spring means comprises a plate spring having a surface arranged to be urged into engagement in one of said grooves in said support rod for selectively adjusting the height of said headrest member above the vehicle seat, said plate has a centrally arranged hole, said support member extending through the hole in said plate spring, means for securing said plate spring to said support member, said plate spring being bent into an S-shaped curve in the direction of the longitudinal axis of said rod, the upper end of said plate spring extending inwardly toward the side of said rod containing said grooves, and the lower end of said plate spring being bent inwardly toward the opposite surface of said support rod, whereby said support rod and said headrest member secured thereto is adapted to be adjustably positioned relative to the back of the vehicle seat.

2. A supporting device, as set forth in claim 1, wherein at least a portion of the upper end of said plate spring being bent into a shape generally conforming to the shape of said grooves in said rod, and the lower end of said plate spring being bent in an inwardly and downwardly extending direction relative to the longitudinal axis of said support rod.

3. A supporting device, as set forth in claim 2, wherein a retainer groove being formed in the opposite side of said support rod from the side containing said grooves, said retainer groove being spaced below the lower most one of said grooves, and the lower end of said plate spring being arranged to engage within said retainer groove when the upper end of said spring plate is disposed within the lowermost one of said grooves.

4. A supporting device, as set forth in claim 3, wherein said support member being tubular in shape and encircling said support rod.

5. A supporting device, as set forth in claim 4, wherein a longitudinally extending opening being disposed in said support member in juxtaposition with the side of said support rod containing said grooves, whereby said spring means is arranged to extend through said opening in said tubular member into engagement with said grooves in said support rod.

6. A supporting device, as set forth in claim 5, wherein the lower end of said plate spring being located below the lower end of said support member and being arranged to extend inwardly into the retainer groove in said support rod.